US007008494B2

(12) United States Patent
Cavalotti et al.

(10) Patent No.: US 7,008,494 B2
(45) Date of Patent: Mar. 7, 2006

(54) CUTTING SEGMENT FOR A FALSE DRUM AND METHOD OF SUPPORTING MATERIAL OVERLYING A SLOT

(75) Inventors: Marie-Laure Bénédicte Josette Cavalotti, Michelbouch (LU); John Kolbjoern Roedseth, Bissen (LU)

(73) Assignee: The Goodyear Tire & Rubber Co., Akron, OH (US)

(*) Notice: Subject to any disclaimer, the term of this patent is extended or adjusted under 35 U.S.C. 154(b) by 201 days.

(21) Appl. No.: 10/754,192

(22) Filed: Jan. 9, 2004

(65) Prior Publication Data
US 2004/0140043 A1 Jul. 22, 2004

Related U.S. Application Data

(62) Division of application No. 09/952,536, filed on Sep. 14, 2001, now Pat. No. 6,736,932.

(51) Int. Cl.
*B29D 30/26* (2006.01)
(52) U.S. Cl. ............... 156/110.1; 83/28; 83/56; 83/398; 156/123; 156/133; 156/406.4
(58) Field of Classification Search ............ 156/110.1, 156/123, 130, 133, 405.1, 406.2, 406.4, 414; 83/28, 56, 267, 398
See application file for complete search history.

(56) References Cited

U.S. PATENT DOCUMENTS

| | | |
|---|---|---|
| 1,749,922 A | 3/1930 | Palmer |
| 3,663,012 A | 5/1972 | Van Den Honert |
| 3,732,767 A | 5/1973 | Habert |
| 3,877,651 A | 4/1975 | Harris |
| 4,087,177 A | 5/1978 | Gumm et al. |
| 4,138,307 A | 2/1979 | Rost |
| 4,145,040 A | 3/1979 | Huber |
| 4,202,542 A | 5/1980 | Lammers et al. |
| 4,210,482 A | 7/1980 | Collins |
| 4,262,715 A | 4/1981 | Hausler et al. |
| 4,437,659 A | 3/1984 | Caron et al. |
| 4,445,558 A | 5/1984 | Banner et al. |
| 4,504,337 A | 3/1985 | Askam et al. |

(Continued)

FOREIGN PATENT DOCUMENTS

GB          1010597        11/1965

*Primary Examiner*—Geoffrey L. Knable
(74) *Attorney, Agent, or Firm*—Howard M. Cohn

(57) ABSTRACT

A cutting segment for a False Drum (100,200,300) having a cylindrical outer surface (202,306) comprises a slot (204, 224,330) extending generally axially from end-to-end of the cylindrical surface, a door panel (322) having substantially the same size and shape as the slot; and a mechanism (320) for opening and closing the door panel. The mechanism for selectively opening and closing the door panel includes an elongate lever (324), one end of which supports the door panel, the other end of which is pivotally attached to a stationary portion (point) of the drum, a spring (326) extending between an inner surface of the door panel and another stationary portion of the drum; and an inflatable pneumatic tube (328) disposed between the lever and yet another stationary portion of the drum. There is thereby provided a method of supporting material overlying the cutting slot of the False Drum, by opening the slot when cutting the material, and closing the slot when not cutting the material. Importantly, after the material is cut, the door panel closes the slot so that the cut end of the material does not hang in the slot, but rather is supported, thereby ensuring reliable transfer of the material to a tire building drum.

7 Claims, 8 Drawing Sheets

U.S. PATENT DOCUMENTS

| | | |
|---|---|---|
| 4,516,451 A | 5/1985 | Takeshita |
| 4,591,467 A | 5/1986 | Kopernicky |
| 4,722,255 A | 2/1988 | Choate et al. |
| 4,724,036 A | 2/1988 | Hill et al. |
| 4,747,904 A | 5/1988 | Okuyama et al. |
| 4,767,487 A | 8/1988 | Tomsovic, Jr. |
| 4,816,105 A | 3/1989 | Yamashita |
| 4,857,123 A | 8/1989 | Still et al. |
| 4,874,443 A | 10/1989 | Kipling |
| 4,891,082 A | 1/1990 | Broyles et al. |
| 4,925,113 A | 5/1990 | Wissman et al. |
| 5,066,346 A | 11/1991 | Long et al. |
| 5,073,226 A | 12/1991 | Suzuki et al. |
| 5,111,633 A | 5/1992 | Draghetti |
| 5,183,252 A | 2/1993 | Wolber et al. |
| 5,203,942 A | 4/1993 | DeCook et al. |
| 5,273,613 A | 12/1993 | Sato et al. |
| 5,342,068 A | 8/1994 | Large |
| 5,383,001 A | 1/1995 | Bosy |
| 5,635,016 A | 6/1997 | Byerley |
| 5,820,726 A | 10/1998 | Yoshida et al. |
| 6,182,957 B1 | 2/2001 | Becker |
| 6,209,867 B1 | 4/2001 | Madsen et al. |
| 6,254,090 B1 | 7/2001 | Rhodes et al. |

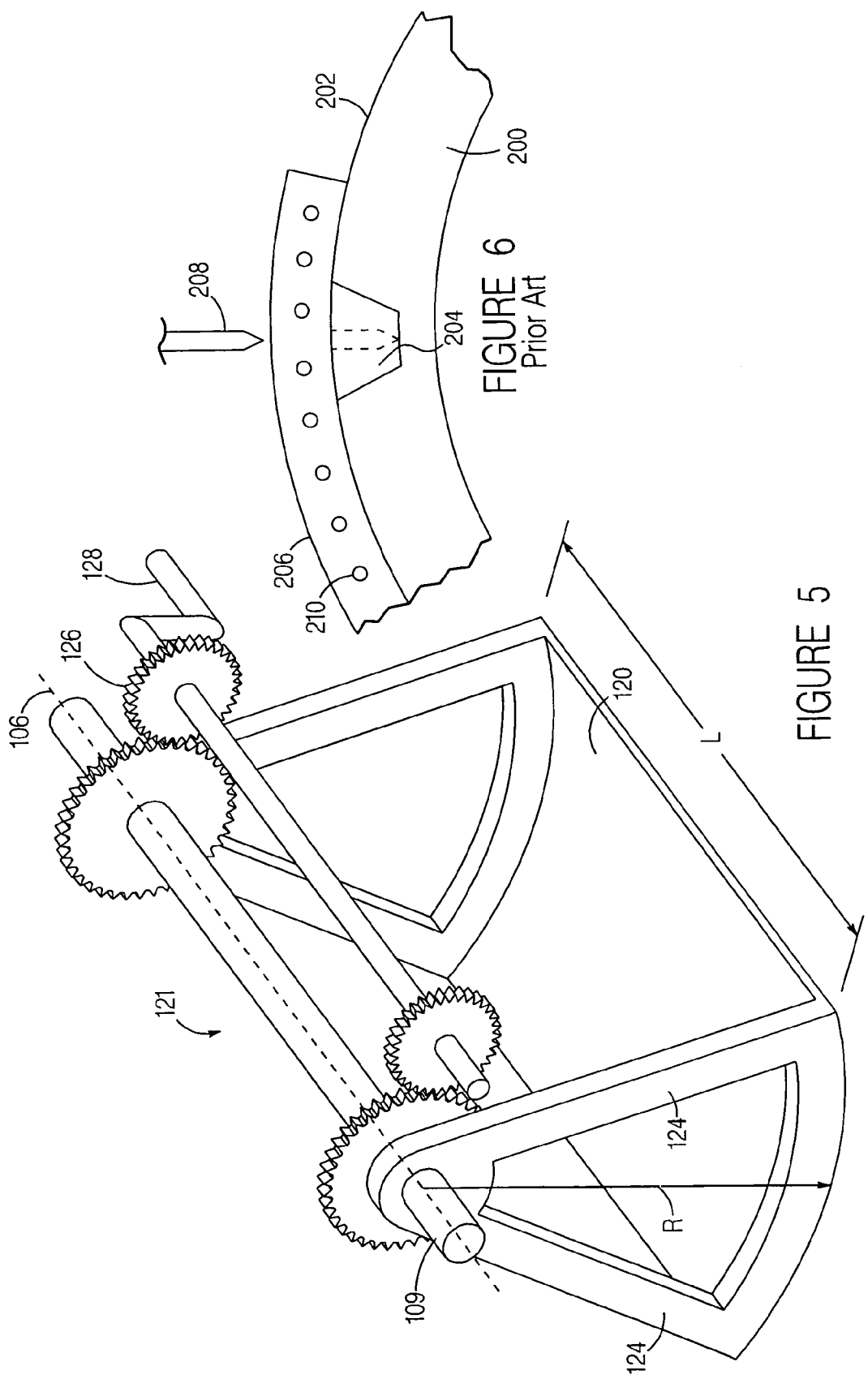

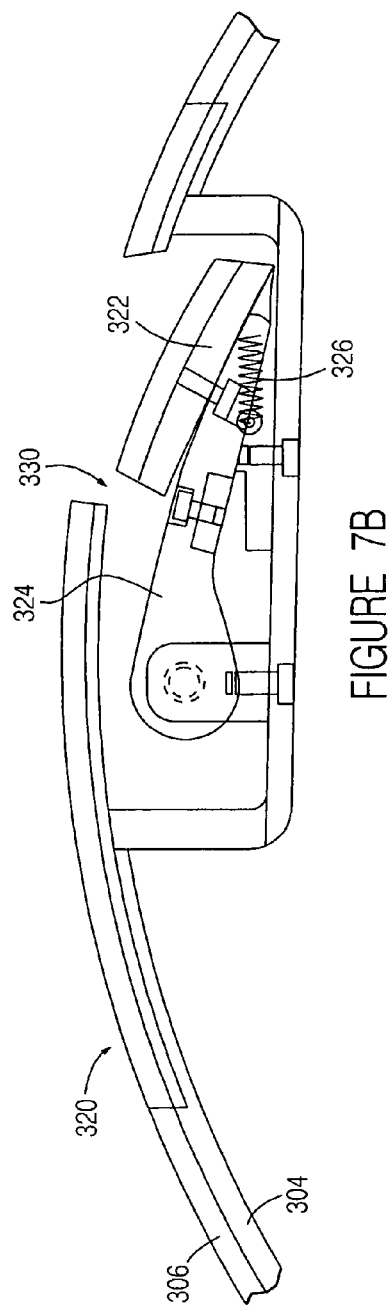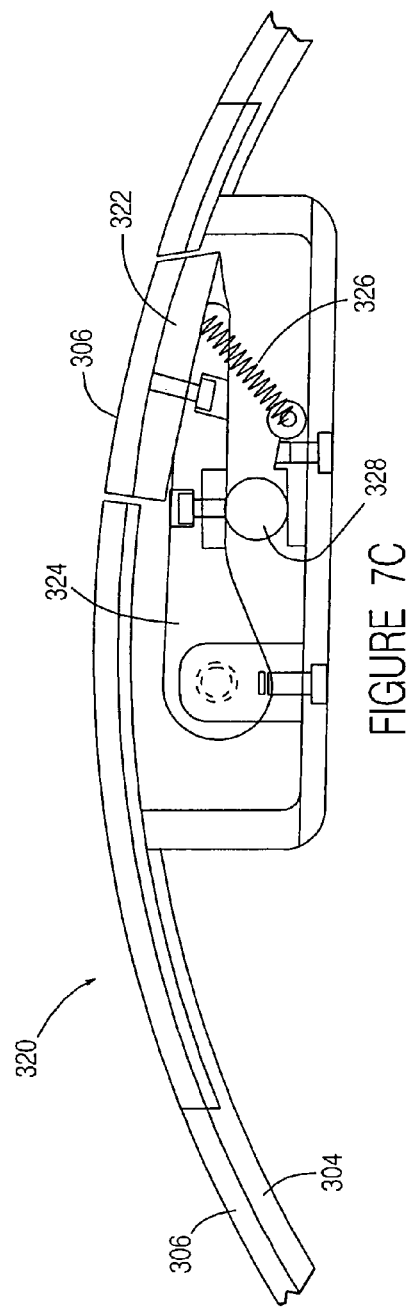

CUTTING SEGMENT FOR A FALSE DRUM AND METHOD OF SUPPORTING MATERIAL OVERLYING A SLOT

CROSS-REFERENCE TO RELATED APPLICATIONS

This is a Divisional application of U.S. application Ser. No. 09/952,536 now U.S. Pat. No. 6,736,932 having a filing date of Sep. 14, 2001 and a common assignee with present application.

This application relates to U.S. patent application entitled FALSE DRUM WITH A VARIABLE AREA VACUUM-SURFACE, Ser. No. 09/952,635 filed Sept. 14, 2001.

TECHNICAL FIELD OF THE INVENTION

The invention relates to methods and apparatus used in the preparation of materials to be used in the fabrication of pneumatic tires. In particular the invention relates to the cutting segment portion of a "False Drum" server on which tire building (e.g., elastomeric sheet) materials are held while being cut prior to being transferred onto a tire building drum.

BACKGROUND OF THE INVENTION

It is known that in making vehicle tires, for example for automobiles, that manufacture of a so-called carcass is first achieved by successively assembling several different components. In other words, the different carcass types included in a production range can be distinguished from one another depending on the presence thereon of the various accessory components and/or the typology of the accessory components themselves. By way of example, when carcasses for tubeless tires are to be produced, that is tires that in use do not require the presence of an inner tube, the main components can be considered to include a so-called inner liner that is a layer of elastomeric air-impervious material, a carcass ply, a pair of annular metal elements, commonly referred to as bead cores, around which the opposite ends of the carcass ply are folded. as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

Certain tire building assembly lines use servers of various kinds for the purpose of securely holding flat materials such as tire innerliner while it is being cut to size. Servers are (Dunlop Rubber Company) or the conveyor and cutting system shown in U.S. Pat. No. 4,722,255 (Choate, et al.), wherein a continuous flat sheet of material is delivered upon a flat conveyor to a cutting knife and then the material is removed to be placed upon the tire being built. Another such conveyor system is taught in U.S. Pat. No. 5,820,726 (Yoshida, et al.), incorporating a "transfer drum" element which feeds material to the conveyor system.

Drum servers, or so called "False Drum" servers, are an alternative conveyor of flat or sheet tire materials that must be held securely during the measuring out of the material, the cutting to length, and the holding of the material until its assembly into the tire. After being cut, the sheet material is moved to the tire under construction on the building drum. Generally such a False Drum server consists of a horizontally disposed drum or cylinder that is able to rotate about its cylindrical axis. One particular False Drum type server consists of a circular cylindrical drum that is hollow. The surface of the drum is perforated between 50 to 80 percent and preferably between 60 to 70 percent, and most preferably about 66 percent of its circumference, and air is pumped out of the drum in sufficient volume that the low pressure within the drum provides a suction adhering surface which can securely hold the flat or sheet materials that are being cut while being held on the server. When a flat sheet of material, such as tire innerliner, is placed on the perforated cylindrical part of the server, the pressure differential between the inside of the drum and the outside causes the flat material to adhere to the drum surface while the material undergoes a cutting operation.

An alternative drum-type server system which also holds flat materials to its cylindrical surface is taught in U.S. Pat. No. 4,504,337 (Askam, et al.) which describes a drum type server system wherein the method by which the flat materials that are held to be cut are held securely by a magnetic surface. Such a system, however, is of course limited in use to flat or sheet tire materials that contain steel or ferromagnetic elements such as wires, cords or metal cloth.

The type of False Drum server described hereinabove, in which air is drawn through a perforated cylindrical surface as a method by which to hold securely the materials being cut, is suitable for use with nonmagnetic sheet of flat material. Also suitable is the vacuum cup method taught in U.S. Pat. No. 4,891,082 (Broyles and Portalupi) wherein "sets of vacuum cups spaced circumferentially" around the circumference of the outer rim of a "transfer roll" which serves essentially the same purpose as the aforementioned False Drum server. The vacuum cups are pumped individually by compressed air motors.

The suction adhering part of the perforated drum type False Drum server is its perforated cylindrical drum surface. The False Drum server has a substantially bigger diameter than a building drum. Sheet rubber components are measured to a required length on the False Drum server, and then are cut before being transferred to the building drum. The elastomeric sheet or flat materials that are placed on the False Drum server are held to the False Drum server because the pressure differential across the perforated cylindrical surface makes the cylindrical surface into a suction adhering surface.

False Drum servers generally have the advantage being faster than traditional conveyor or belt type (flat) servers or roller conveyors in terms of allowing greater speed of cutting of flat sheet materials. A disadvantage of False Drum servers, however, is that for flat components, such as innerliner and ply, the portion of the perforated cylindrical surface that is not covered by the flat material being cut is open to the free flow of air into the drum. Such free flow of air weakens the pressure differential that holds the sheet material to the drum. (Uncovered holes represent "leaks".) One way to deal with this leakage problem is simply to use adhesive tape or other materials to block the flow of air through those portions of the perforated surface that are not covered by the flat sheet material. (In other words—plug the holes.) But since the various pieces of material being cut are often of different sizes from one another, as typically happens when changing from a large tire component to a smaller component, the tape or other air flow blocking material must be removed and replaced so that the low pressure inside the drum can thereby be maintained. (You don't want holes to be plugged where you want the vacuum-suction to hold material.) However, the time required to place tape over the unused portions of the perforated surface area, and remove it later, is undesirable. Another risk of the tape hole-plugging method is contamination of the tire components with pieces of adhesive tape that might work loose and attach themselves to the sticky uncured elastomeric material.

An alternative to the use of tape is to use a massively over-dimensioned air pump to remove air from inside the False Drum. With a sufficiently high capacity air (vacuum) pump, holes (leaks) become a non-problem. However, oversized pumps are not desirable because of energy consumption and environmental considerations as well as overall capital costs and operating costs. Another solution is proposed in the aforementioned U.S. Pat. No. 4,891,082 (Broyles and Portalupi) which discloses the use of individually controllable vacuum pumps for each vacuum cup used to hold sheet materials on a cylindrical surface. This method requires, however, that complex controls be used to control the individual vacuum pumps to achieve both economy of operation and the ability to provide a suction adhering surface having a size that rapidly accommodates flat sheets having different amounts of surface area of specific flat sheet materials being held by suction forces to the cylindrical surface.

The present invention is more particularly directed to a cutting segment of a False Drum, which is suitably of the aforementioned type having a perforated surface for holding sheet material thereon.

SUMMARY OF THE INVENTION

According to the invention, a cutting segment for a False Drum having a cylindrical outer surface upon which material is cut to a desired length, has a slot extending generally axially from end-to-end of the cylindrical surface, the slot being sized and shaped to permit a cutting tool to pass through a portion of the material overlying the slot, the cutting segment being provided with a door panel having substantially the same size and shape as the slot, and a mechanism for opening and closing the door panel.

According to a feature of the invention, the slot extends generally axially across the drum and is butterfly-shaped, having two triangular portions positioned apex-to-apex.

According to a feature of the invention, multiple door panels may be employed, and multiple mechanisms may be employed for operating the multiple door panels.

In an embodiment of the invention, the mechanism for selectively opening and closing the door panel includes an elongate lever, one end of which supports the door panel, the other end of which is pivotally attached to a stationary portion (point) of the drum, a spring extending between an inner surface of the door panel and another stationary portion (point) of the drum; and an inflatable pneumatic tube disposed between the lever and yet another stationary portion (point) of the drum.

According to a feature of the invention, a plurality of such door panel operating mechanisms may be distributed along a length of the slot, at evenly-spaced intervals. Alternative door panel-operating mechanisms are discussed.

The invention provides a method of supporting material overlying the cutting slot of the False Drum, by opening the slot when cutting the material, and closing the slot when not cutting the material (e.g., before the material is cut and/or after the material is cut). Importantly, after the material is cut, the door panel closes the slot so that the cut end of the material does not hang (droop) in the slot, but rather is supported, thereby ensuring reliable transfer of the material to a tire building drum.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
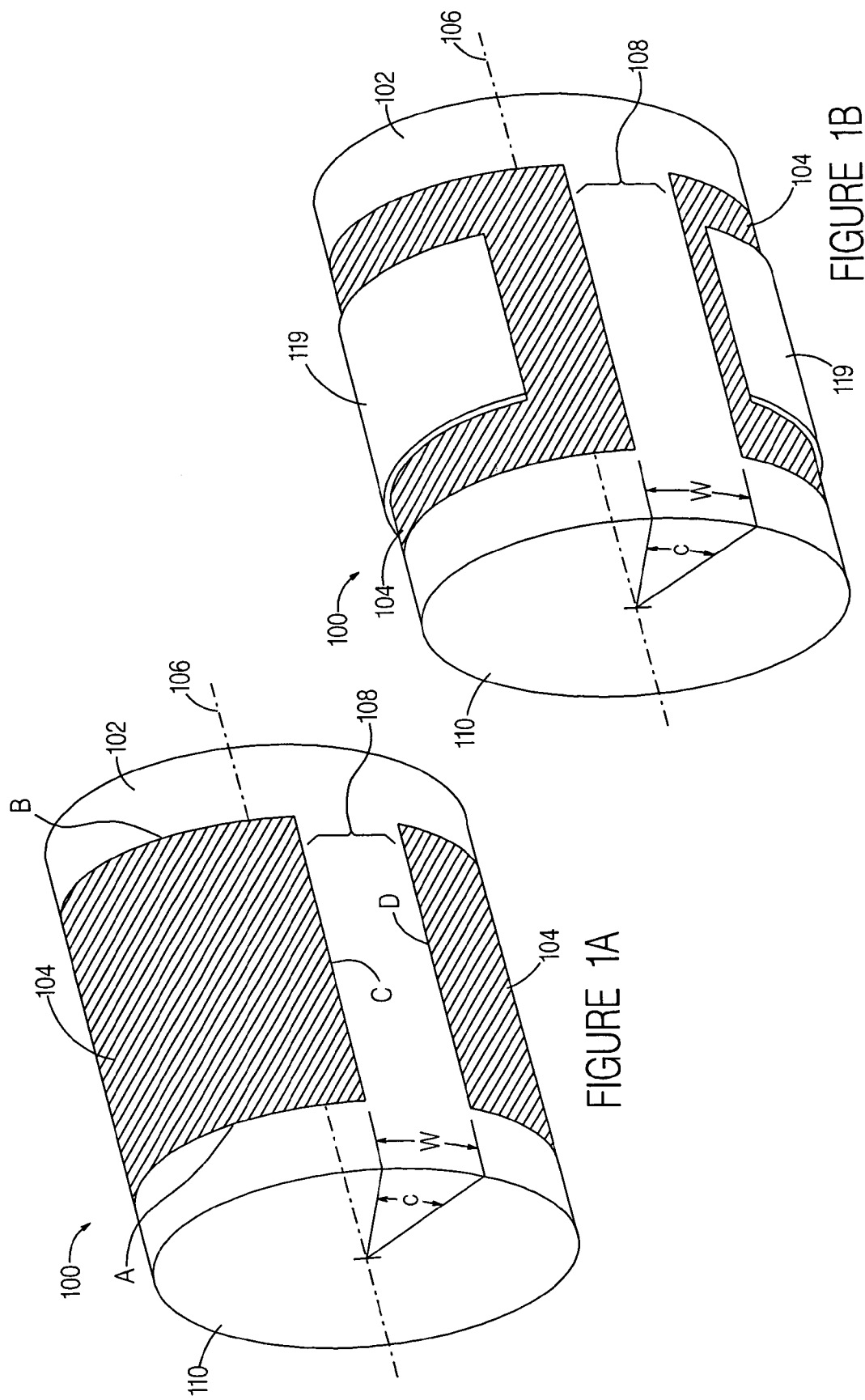
Figure 2:
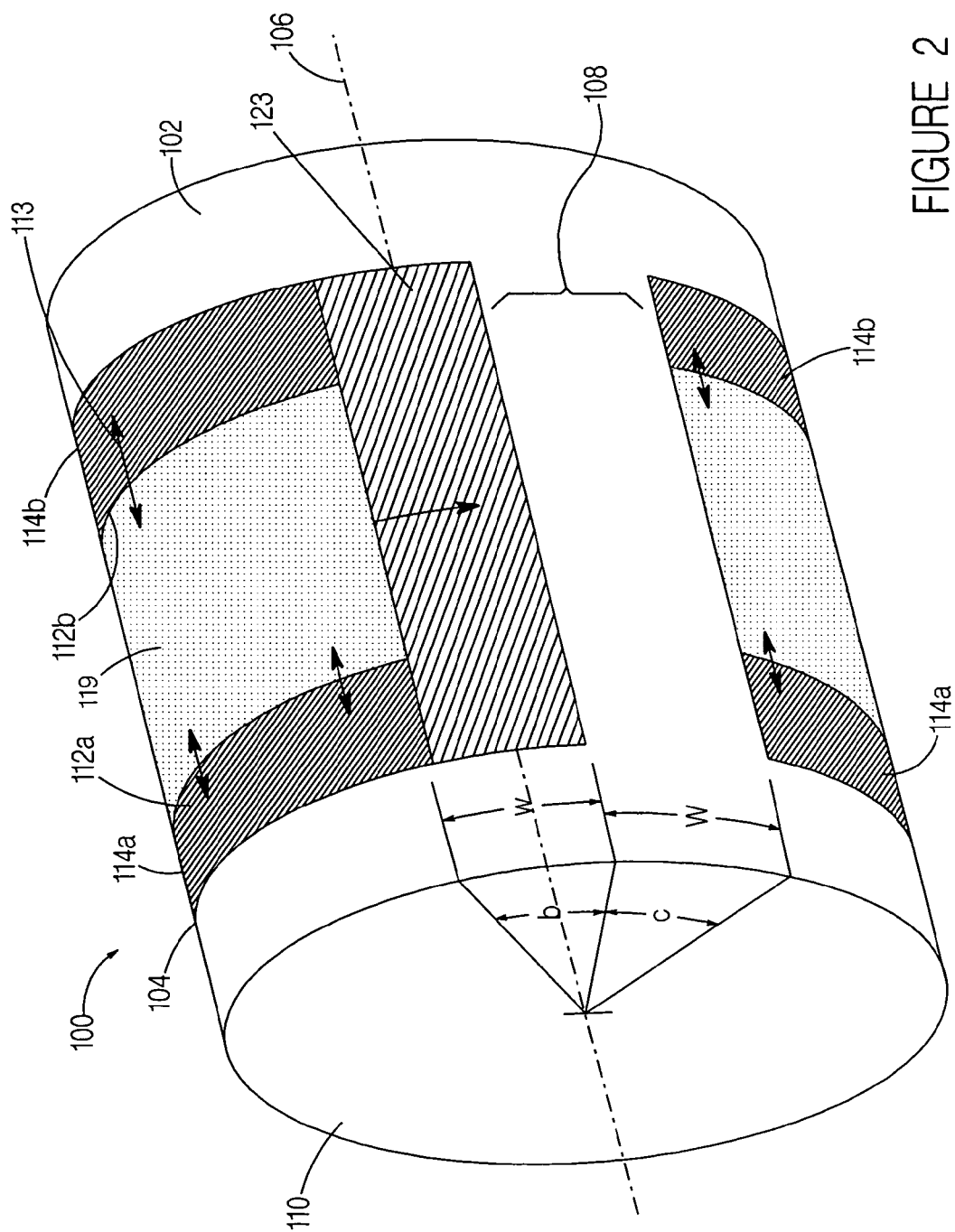
Figure 3:
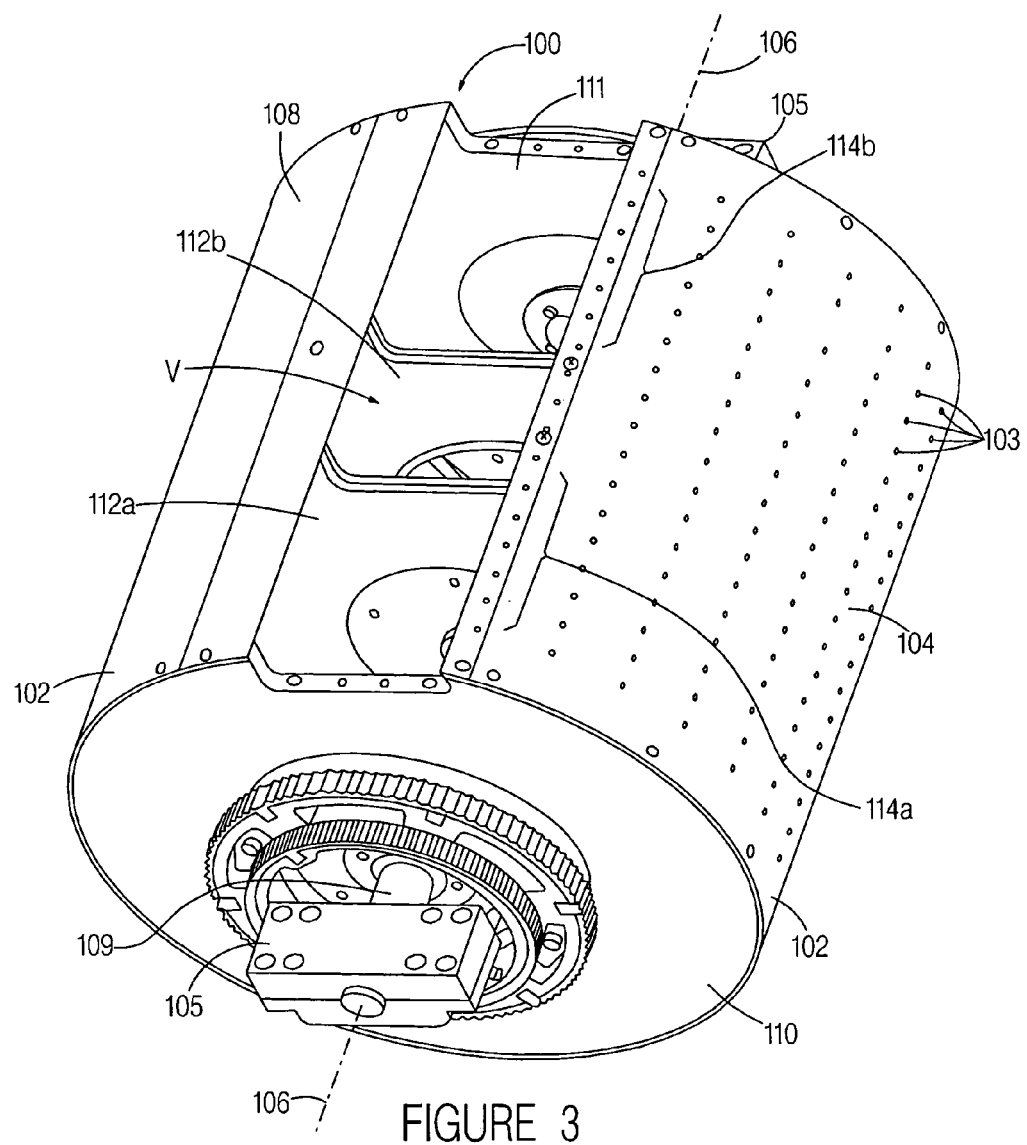
Figure 4:
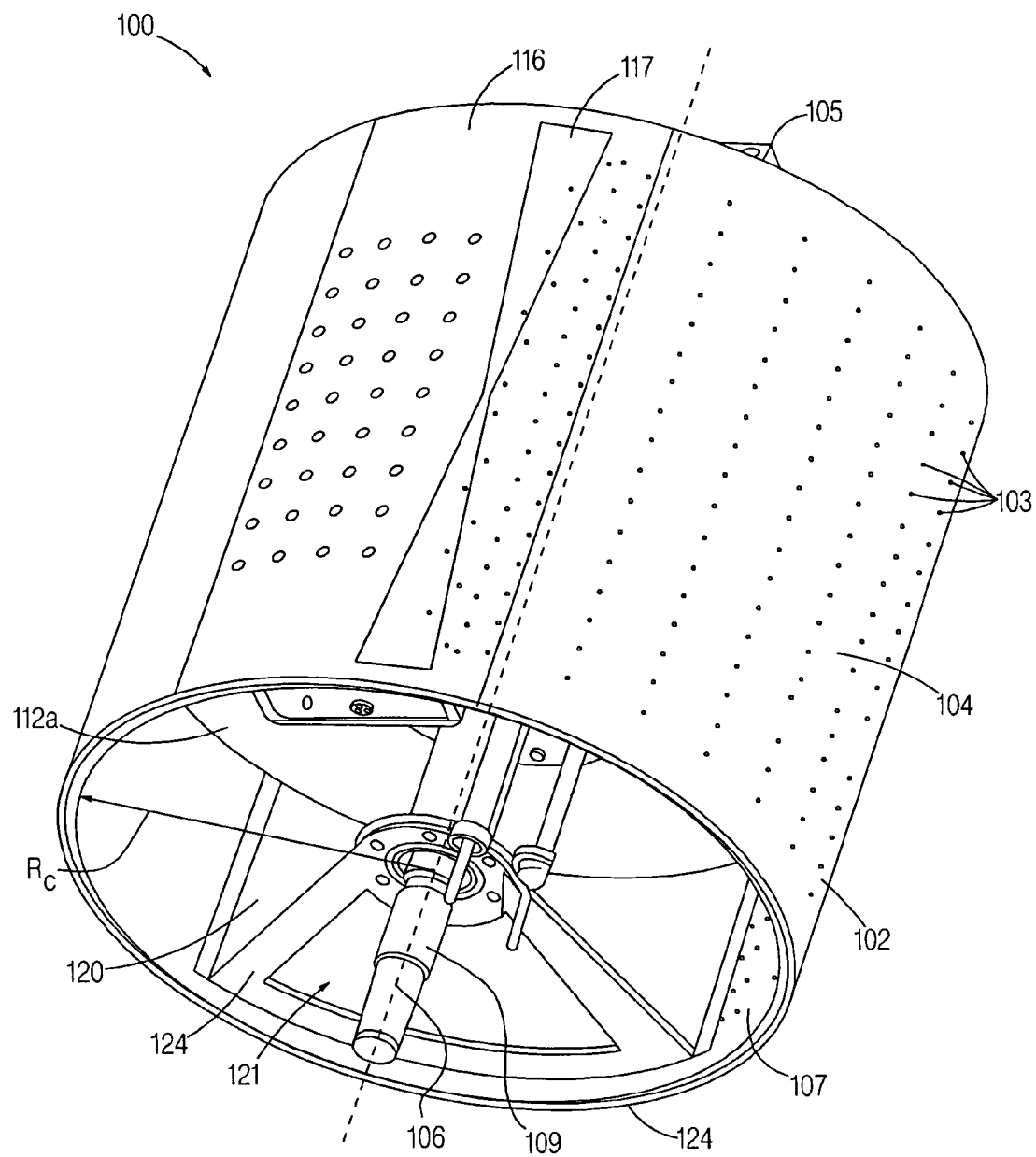
Figure 6A:
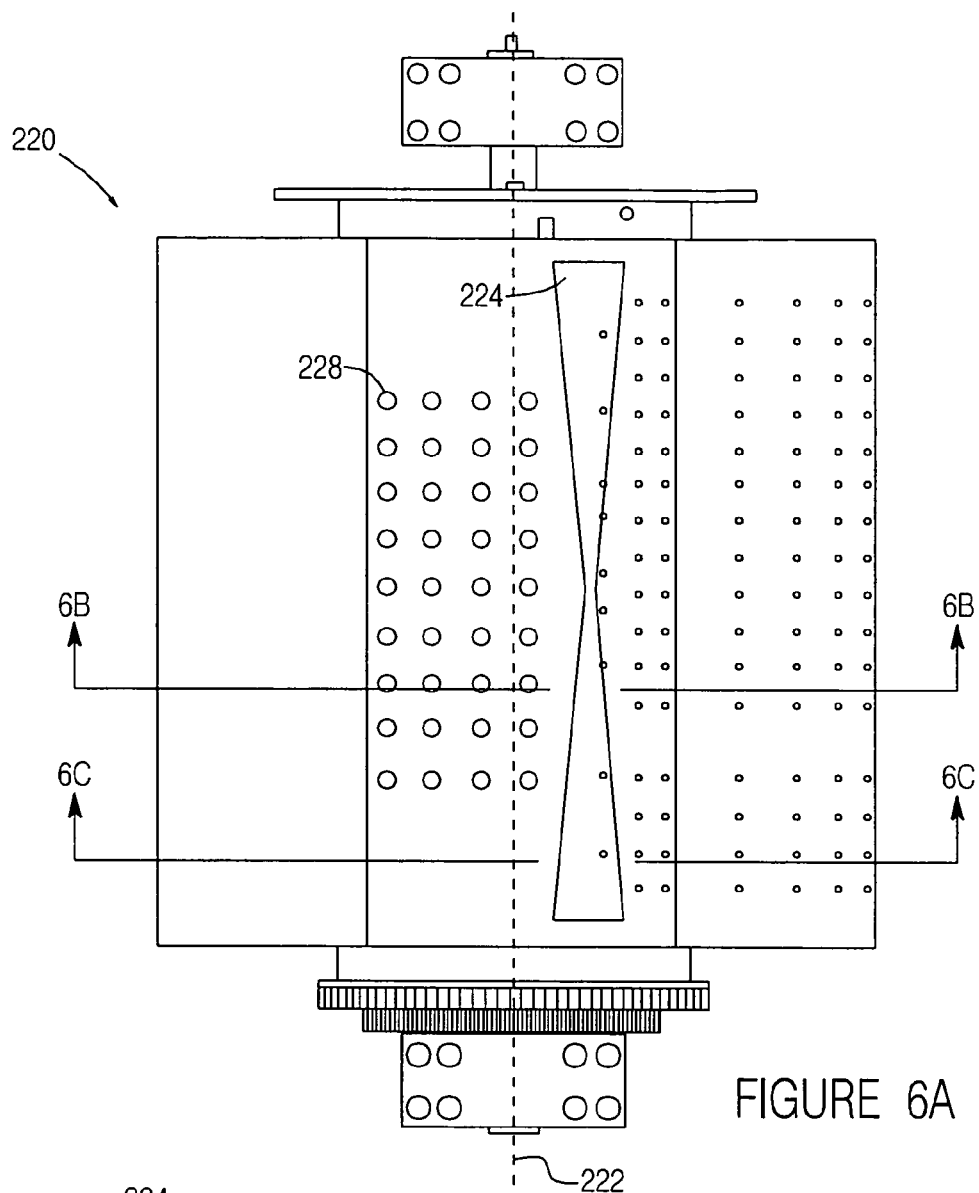
Figure 6B:
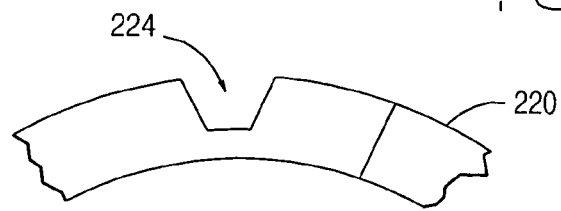
Figure 6C:
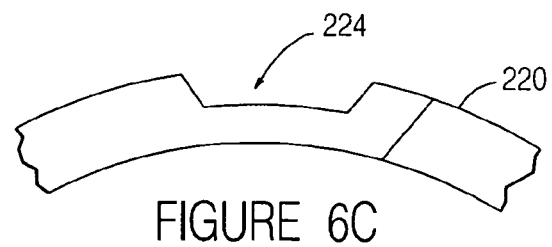
Figure 7A:
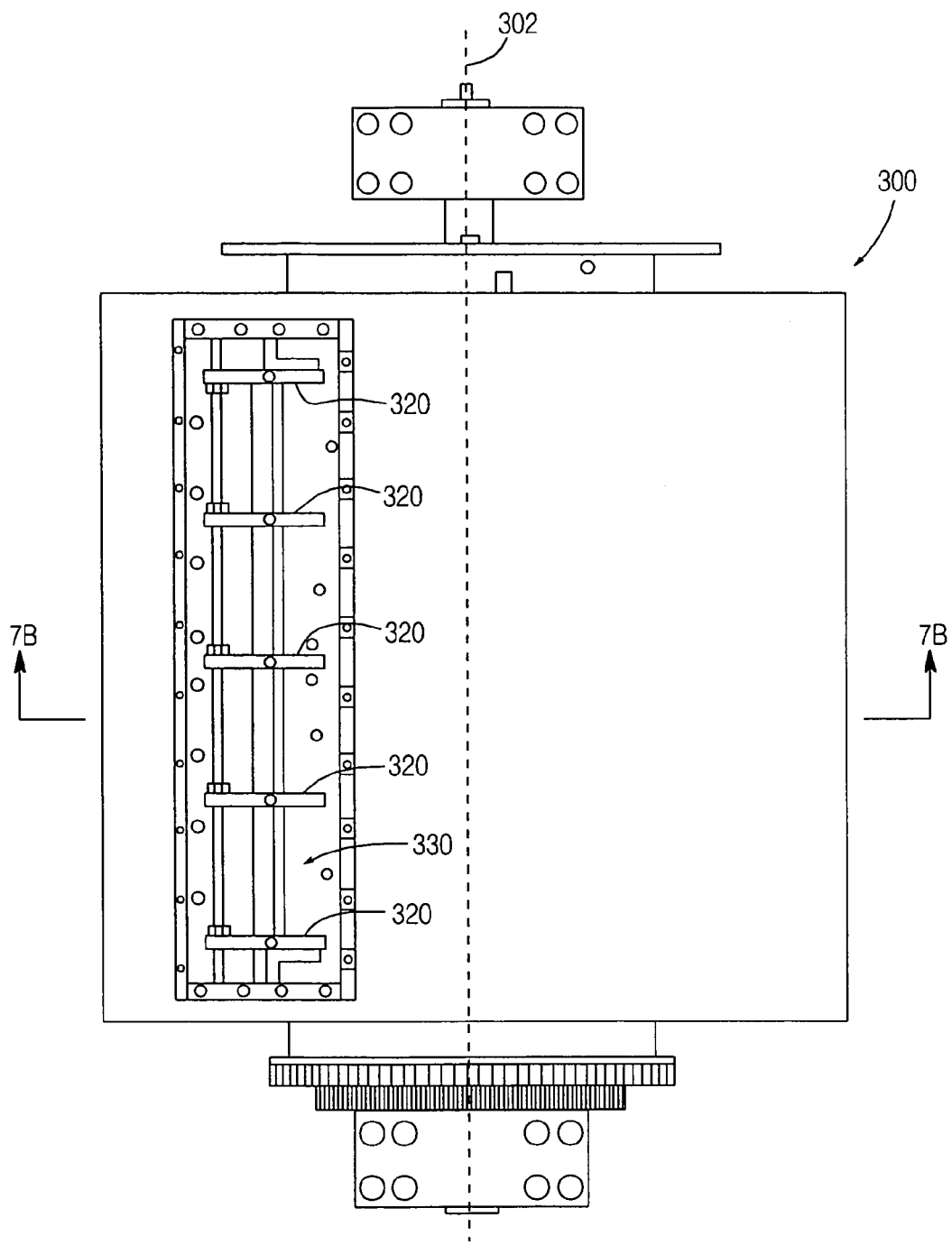

The structure, operation, and advantages of the present preferred embodiment of the invention will become further apparent upon consideration of the following description taken in conjunction with the accompanying drawings, wherein:

FIG. 1A is a schematic oblique view of a perforated cylindrical drum;

FIG. 1B is a view of the drum of FIG. 1A with a sheet of flat material being held to its perforated surface;

FIG. 2 is a schematic oblique view of a hollow perforated cylindrical drum showing the regions of the perforated surface that are blocked or unblocked to airflow;

FIG. 3 is an oblique view of the hollow perforated cylindrical drum with the knife guide removed to reveal the axially moveable circular plates;

FIG. 4 is an oblique view of the hollow perforated cylindrical drum with the knife guide in place but with the one endplate removed to reveal the axially moveable circular plates and the circumferentially moving semi-cylindrical plate;

FIG. 5 is an oblique view of the semi-cylindrical plate and its support structure that fit inside the perforated drum;

FIG. 6 is a cross-sectional view of a portion of a False Drum, according to the prior art;

FIG. 6A is a plan view of a False Drum, according to the invention;

FIG. 6B is a cross-sectional view of a portion of the False Drum of FIG. 6A, taken on a line 6B—6B though FIG. 6A, according to the invention;

FIG. 6C is a cross-sectional view of a portion of the False Drum of FIG. 6A, taken on a line 6C—6C though FIG. 6A, according to the invention;

FIG. 7A is a plan view of a False Drum, according to the invention;

FIG. 7B is a cross-sectional view of a portion of the False Drum of FIG. 7A, in an open position, closed taken on a line 7B—7B though FIG. 7A, according to the invention; and FIG. 7C is a cross-sectional view of a portion of the False Drum of FIG. 7A, in a closed position, closed taken on a line 7B—7B though FIG. 7A, according to the invention.

DETAILED DESCRIPTION OF THE INVENTION

A False Drum server consists primarily of a hollow perforated cylinder (drum) having a diameter substantially bigger than that of a tire building drum. The drum is rotatable about its axis. The cylindrical part of the drum is perforated (has holes) over between 50% and 80% and preferably about 66% of its cylindrical surface and the ends of the drum are sealed against airflow except as the flow of air from inside of the drum is provided by way of an air pump that removes air from the drum. Air moves into the drum through the perforated surface, because of the internally reduced pressure relative to the outside air pressure. The terms "drum" and "measuring drum" and "False Drum" server are herein to be regarded as synonymous except as the term "drum" is specifically referred to as an element or component of a False Drum server.

FIG. 1A is an oblique schematic view of the perforated portion 104 of the cylindrical drum 102 of the False Drum server 100. A portion 104 of the overall cylindrical drum 102 is perforated. It has holes leading from the exterior of the drum to the interior thereof. The portion 104 is generally shaped like a rectangle wrapped around about ⅔ of the circumference of the cylindrical drum 102. The perforated portion 104 is sized according to the largest tires expected to be built on the machine. The perforated portion 104 is, in its own right, a cylinder concentric with the cylindrical drum 102, but having a lesser height than the cylindrical drum 102, and extending only partially around the surface of the cylindrical drum 102. Also shown in FIG. 1A is the axis 106 of the cylindrical drum 102 and one endplate 110 which covers and seals an end of the cylindrical drum. The other end of the cylindrical drum 102 is also sealed with an endplate (not visible in this view) so as to maintain a low pressure zone inside the cylinder; that is, both ends of the cylindrical drum 102 are sealed in an airtight way. The cylindrical drum 102 may rotate about the axis 106.

FIG. 1A further shows a region 108 which is not perforated and has an arc width W subtending an angle a with respect to the axis 106. This cylindrical segment portion of the False Drum server houses a removable knife guide plate.

During use of the False Drum server, lengths of flat elastomeric or other sheet materials such as tire innerliner can be placed (fed) onto and held onto the drum while being cut. After each given sheet of material is cut to size, it is transferred to the tire building drum (not shown). FIG. 1B shows the drum 102 of FIG. 1A with a piece of flat material 119 being held on the surface thereof, by a pressure differential between the inside and outside of the cylindrical drum 102.

Those skilled in the art will be aware that the efficiency of such an arrangement in providing a suction adhering perforated surface 104 by which to hold the flat material 119 securely could be improved if the portion of the perforated surface 104 that is not covered by the flat material 119 is somehow otherwise covered in order to block the flow of air into the drum 102. Unwanted air flow (leaks) will have the undesired effect of reducing the pressure differential that allows the sheet material 119 to be held securely in place during the measuring out of the material, the cutting to length, and the holding of the material until its assembly into the tire. Typically, in standard operational practice, the portion of the perforated surface 104 which is not covered by sheet material 119 being held to the surface is taped with masking tape or other suitable tape (not shown) to block the undesired flow of air into the drum 102 through the uncovered holes 103.

The present invention facilitates controlling the effective dimensions of the perimeter areas of the perforated surface 104. That is, the present invention varies the effective area of the perforated surface 104 in a controlled way along its edges, so that when smaller pieces of sheet material 119 are placed on the server, holes outside the area of the material do not represent "leaks". Time can thus be saved by not having to cover those portions of the perforated surface 104 through which air would otherwise be free to flow because they are not covered by the sheet material 119. In other words, the present invention provides methods and apparatus by which to rapidly adjust the size of that portion of the perforated area 104 through which air can be drawn into the cylindrical drum 102.

While the apparatus described in U.S. Pat. No. 4,891,082 (Broyles and Portalupi) for providing a suction adhering surface of variable size includes a variable area suction surface, it requires multiple pumps. The present invention has the benefit of using a single air pump to provide a suction adhering surface area which is thereby simpler in construction. Moreover, the present invention maintains the existing apparatus and method of providing a uniformly cylindrically flat surface. Also, it should be noted that the present invention is not per se a type of suction adhering surface, but rather is apparatus and methods by which to vary, in a controllable way, the portion or area of a perforated suction adhering surface that provides suction adherence for individual flat sheet materials having differing dimensions from one another. In a sense, the present invention could be used with an existing (prior art) drum surface, without modifying the surface per se.

The present invention includes two principal apparatus components. One of them works to vary or limit, in a controllable way, the movement of air into the drum by way of the lateral (axial) regions of the perforated area 104 that are not covered by the sheet material 119 being held in place. The lateral regions or areas are here defined as the two separated portions of the perforated area 104 that are closest to the two endplates 110 of the cylindrical drum 102. In FIG. 1B the two regions of the perforated area 104 that lie on either side of the sheet material 119 are called herein lateral regions. The second apparatus component works to vary or limit, in a controllable way, the movement of air into the drum 102 by way of the semi-cylindrical regions or areas of the perforated area 104 that are not covered by the sheet material 119 being held in place. In general, the semi-cylindrical regions or areas are defined herein as portions or areas of the perforated area 104 that extend at least part way around the cylindrical drum 102. For example, in FIG. 1A, the perforated area 104 contained within the area bounded by the letters A,B,C and D is defined here as a semi-cylindrical area because it is curved in the shape of a cylindrical segment which extends part way around the perforated portion 104 of the cylindrical drum 102.

FIG. 2 is an oblique schematic view of the False Drum 102 showing the effect of the above-described two components on the size of the portion of the perforated area through which suction adhering force can be applied to a piece of sheet material 119. The two lateral perforated areas 114a, 114b are the lateral portions of the total perforated area 104 through which air cannot flow because of the presence of two circular barriers 112a,112b, described in detail hereinbelow, inside of the drum 102. The circular barriers 112a, 112b are essentially discs, or baffle plates, which can be moved to different positions within the drum 102 so that there is only vacuum in the space between the two axially-separated discs. The circular plates 112a,112b have a radius of curvature $(r_e)$ less than the radius of curvature $(r_i)$ of the inner surface 107 of the perforated cylindrical drum 102.

The two-headed arrows 113 show the directions of movement of the two circular barriers (baffle plates) 112a,112b, and of the corresponding perforated lateral areas 114a,114b through which air cannot be drawn into the drum 102 due to the presence of the barriers. Also in FIG. 2 is shown semi-circumferential perforated region 123 which is blocked to airflow by the presence of the airflow 120, to be described in detail below, also disposed inside of the False Drum 102.

FIG. 3 is an oblique view of a False Drum 100 comprising a cylindrical drum 102 with perforations 103 through the perforated portion 104 between its outer and inner surface. Inside the drum 102 are two circular barriers 112a,112b (baffle plates) that are adjustable in relation to one another along the axis 106 of the drum. The circular barriers 112a, 112b are moveable in a symmetric way, i.e., towards or away from one another. The relative motions of the barriers (baffle plates) is controlled by a left-right handed screw (not shown) from the outside of the False Drum server 100. The perimeter of each of the baffle plates 112a,112b has a seal (not shown) such that each moveable baffle plates has a substantially air-tight seal against the inside surface 107 of the cylindrical drum 102, and so that the baffle plates can move axially within the cylinder 102 with low friction during axial movement. The movement of the baffle plates 112a,112b is preferably in equal but opposite directions, i.e., toward or away from one another, which provides a symmetric way to block the flow of air inside the drum 102 from the lateral regions or areas 114a,114b of the perforated surface region 104 of the cylindrical drum 102. This presumes that the material holding area on the exterior surface of the drum 102 is desirably symmetrical. If not, the baffle plates 112a,112b can certainly be individually and asymmetrically controlled with an appropriate mechanism.

Air is drawn from the cylindrical volume V between the two baffle plates 112a,112b. The air that is pumped from the volume V is removed by way of a pump and other apparatus (not shown) which communicate with the innermost regions of the drum 102 and the volume V such as by way of a hollow axle that is concentric with and internal to shaft 109 mounted in pillow blocks 105. Air pressure differential across the perforated surface 104 in the region of the cylindrical volume V contained between the two baffle plates 112a,112b creates a suction adhering surface, the lateral regions of which are adjustable. Note in FIG. 3 the open space 111 in the circumference of the cylindrical drum 102. FIG. 4 shows that space 111 in FIG. 3 with a cylindrical segment 116 having a cutting knife guide 117 installed. Since there is only one volume V, there need only be one pump for removing air from the volume V to create the desired pressure differential across the inner and outer perforated surface of the cylindrical drum 102.

By adjusting the axial position of the barriers 112a,112b inside of the drum 102, the width of the portion of the False Drum perforated surface 104 through which the air can be drawn can be varied to suit (e.g., match) the width required for a particular sheet component 119 being held to the drum. That is, the width dimensions of the portion of the perforated surface 104 that is able to provide a suction adhering surface for sheet materials 119 is able to be varied according to the axial positioning of the internal baffle plates 112a,112b.

In other words, two axially slidable, baffle plates 112a, 112b are placed within the interior of the drum 102. The outer diameter of the baffle plates 112a,112b is substantially equal to the inner diameter of the drum 102. The space between the baffle plates 112a,112b defines a chamber—in this case, a vacuum chamber V. The baffle plates 112a,112b may be positioned along the axis 106 of the hollow cylindrical drum 102 to vary the axial extent of the vacuum chamber, and thereby control the amount of perforated surface area through which air can be drawn into the hollow cylindrical drum. Each of the axially-moveable baffle plates 112a,112b is slidably sealed against the inner surface 107 of the perforated hollow cylindrical drum 102. A mechanism is provide for moving the baffle plates toward or away from one another. For example, the baffle plates 112a,112b each have a perimeter seal made of felt or other suitable material to block the movement of air around the perimeter of each of the two moveable circular barriers or plates. The axially moveable baffle plates 112a,112b disposed inside each opposing end of the perforated hollow cylindrical drum 102 are able to be moved towards or away from each other to vary the width of a central perforated surface area through which air can be drawn to provide an outer suction adhering surface 104 on the perforated hollow cylindrical drum.

FIG. 4 shows essentially the same view of the False Drum server 100 as is shown in FIG. 3, but with the endplate 110 removed and the cylindrical segment 116, with knife guide 117 secured in place. Also shown the FIG. 4 is an apparatus 121 comprised of a metal plate 120 having the shape of a cylindrical segment and a central shaft 109 which is connected to the plate 120 by way of the struts 124.

The apparatus 121 is shown independently, and outside of (separately from) the drum 102, in FIG. 5. The apparatus 121 consists of a metal plate 120 having the shape of a cylindrical segment having a radius of curvature R about the central shaft 109. The radius of curvature R is slightly less than the radius of curvature of the inside surface 107 of the perforated drum 102. The plate 120 is attached to the central shaft 109 by struts 124. The overall length of the portion of the apparatus 121 between the most separated portions of the support struts 124 is less than the length of the cylindrical drum 102.

FIG. 4 shows the apparatus 121 installed inside the drum 102 having the perforated surface area 104 with perforations 103. FIG. 4 also shows one of the barrier plate 112a inside the drum 102. Note that the circular barrier plate 112a (and also the barrier plate 112b, which is not shown) is designed to move axially along axis 106 inside the drum 102. The aforementioned seals extending outward from the perimeter on each of the two barrier plates 112a,112b can seal against unacceptable levels of airflow between the perimeters of the barrier plates 112a,112b and the inner surface 107 of the cylindrical drum 102 in the perforated region 104. The perimeter seals of the two barrier plates 112a,112b are also able to ride over the thin metal plate 120 of the apparatus 121.

FIG. 5 is an oblique view of the semi-cylindrical plate support and moving apparatus 121 that is discussed hereinabove which is, like the two axially moving circular barriers 112a,112b, disposed internally of the False Drum 102. A metal plate 120 has the shape of a cylindrical segment having a radius of curvature R from axis 106 through the central shaft 109, which is slightly less than the radius of curvature of the inner surface 107 of the perforated drum 102. The plate 120 is attached to the central shaft 109 by struts 124. The overall length L of the portion of the apparatus 121 between the most separated portions of the support struts 124 is less than the length of the interior surface 107 of the drum 102.

When the plate 120 is disposed inside of the drum 102, and the plate 120 is adjacent the inner side of the perforated portion 104 of the drum 102, the movement of air into the drum from the outside is thereby impeded in that region. That is, the plate 120 blocks the flow of air into the drum 102 through the portion of the perforated area that is covered by the plate 120 which is made of rigid, thin sheet material.

It is important to note that the plate 120 is made of thin, rigid material in order to withstand the pressure differential between the inside of the drum 102 and the outside of the drum without deflecting inward toward the center of the drum. Those who are knowledgeable of the arts of mechanical design will note that the cylindrical segmental shape of the plate 120 will contribute to the rigidity of the thin metal plate in withstanding the pressure differential.

Referring to FIG. 5, there is shown provided a mechanism 126 by which a hand crank 128 or a motor-controlled shaft can convey to the apparatus 121 supporting the plate 120 an angular motion and a fixed angular position inside of the drum 102.

It is within the scope of the invention that both controlling the lateral and semi-cylindrical size of the openings 103 into False Drum 102 limit, control or vary the dimensions of that portion of the perforated surface area 104 of the perforated drum 102 through which air can be drawn into the drum. The two circular barriers (baffle plates) 112a,112b (FIGS. 3 and 4) are intended to move axially within the region between the support struts 124 of the plate 120. The thinness of the plate 120 is such that the perimeter seals on the barrier plates 112a,112b will accommodate the plate, sealing adequately against the unwanted flow of air around the perimeters of the barriers in the immediate region where the perimeter seals meet, ride over, and slide upon the plate 120.

The circumferentially moveable, cylindrically curved plate or element 120 disposed inside the hollow cylindrical drum 102 has an axis of rotation contiguous with the axis of the hollow cylindrical drum and has a length less than the length of the cylindrical volume inside the hollow cylindrical drum, and an outermost radius of curvature about equal to the radius of curvature of the inner surface 107 of the hollow perforated cylindrical drum. The circumferentially moveable cylindrically curved element 120 has an arc width in the range of about 60 degrees to about 120 degrees, and preferably about 80 degrees to 90 degrees with respect to the axis of rotation of the cylindrically curved element.

In other words, a circumferentially moveable curved cylinder segment 120 conforming to the inner surface 107 of the perforated cylindrical drum 102 is located inside of the hollow drum. The amount of perforated surface area 104 through which air can be drawn into the hollow cylindrical drum 102 is varied by circumferentially positioning the curved cylinder segment 120 adjacent a portion of the inner surface 107 of the hollow perforated cylindrical drum.

It may be useful to envision the perforated area as being (as mentioned above), essentially a rectangle wrapped around about 50% to 80% and preferably about 60% to 70% of the circumference of the cylinder 102. The perforated area 104 is sized according to the largest tires expected to be built on the machine. The rectangle has a length that extends part way circumferentially around the cylinder and a width that extends across most of the axial length of the horizontally disposed cylindrical drum or False Drum server. The operation of the invention reduces or increases the "effective" width and/or length of the perforated rectangular area according to the sizes of the pieces of flat sheet material desired to be held on the surface of the False Drum server required for the size of the tire being manufactured, during the measuring out of the material, the cutting to length and holding the material till its assembly into the tire.

Cutting Segment for a False Drum

There has thus been described an example of a False Drum having a perforated outer surface, two axially movable disc-like baffle plates defining an area of the surface of the drum which will exert suction on a sheet of material laid on the surface of the drum, and a circumferentially moveable curved cylinder segment conforming to the inner surface of the drum for further controlling the amount of perforated surface area through which air can be drawn into the hollow cylindrical drum.

FIG. 4 illustrated a cylindrical segment having a cutting knife guide. The general idea is that material is disposed on the surface of the False Drum, and is then cut to length. There is now described an inventive cutting segment of a False Drum, in greater detail.

It should be understood that cutting segment described hereinafter is not dependent on the previously described False Drum, but rather is very well suited to incorporating with the previously described False Drum. The cutting segment can also work with other False Drums. Many tire building machines use False Drum servers for many of the components. The False Drums are basically a cylindrical surface, upon which tire-building components are measured out to the required length, cut, and from which the components are applied (transferred) to a tire building drum. The components are typically sheets of elastomeric material (such as ply material, having cords embedded therein), and are mainly adhered to the False Drum by means of vacuum, created by drawing air out from inside the False Drum (as described hereinabove). Small holes or porous material through the outer cylindrical surface allows the rubber component(s) to be sucked to the outer surface. The elastomeric material is fed lengthwise onto the False Drum. The width of the elastomeric material is axial, with respect to the drum. The width of the material corresponds generally to the bead-to-bead dimension of the finished tire (as measured along the sidewalls and across the tread).

A typical tire component requiring cutting on a False Drum is ply material, which has cords embedded in an elastomeric layer. Ply material is well known. In order to cut the ply material to its required length, heated knives (a type of cutter, or cutting tool) are plunged through the ply, between the cords in the center of the material width. The knives are then drawn up outwards (retracted) to beyond the edges of the material. This has proven to be a reliable method to cut this type of material, and is known throughout the rubber industry.

In order to use this type of cutter on a False Drum server, a slot or opening for the knives to pass through the material being cut must to be provided. With respect to ply material having cords embedded therein, the cords in the ply material may be disposed at angles for different tire constructions. For example, the cords may be oriented at 0 degrees, or parallel to the axis of the False Drum. Or, they may be inclined, for example, up to 10 degrees (in either direction) with respect to the drum axis. In the main, hereinafter, cutting material which is ply material having cords is discussed, but it should be understood that the present invention is not limited to cutting only ply material.

FIG. 6 is a cross-sectional view of a portion of a False Drum 200 of the prior art. The drum 200 has an outer surface 202 which may be perforated (not shown), as described hereinabove. A slot 204 is provided in the outer surface 202 of the drum. The slot 204 extends generally axially from end-to-end of the cylindrical surface of the drum.

A sheet of elastomeric material 206 is shown on the outer surface 202, and overlies the slot 204. A cutting tool in the form of a knife blade 208 is shown (solid lines) disposed radially (with respect to the drum) outward from the slot 204, poised to cut the material 206 at the position of the slot 204. The knife blade 208 is shown in dashed lines as having passed (pierced) through the material 206, thereby cutting the material to a desired length. Also shown in this figure are cords 210 embedded in the material 206. The cords 210 are shown at 0 degrees (parallel to the axis of the drum, or extending straight across the width of the material 206). The knife blade 208 passes conveniently between the cords. Therefore, the knife blade 208 should be at approximately the same angle (with respect to the drum axis) as the cords 210. Generally, the knife blade 208 is positioned so as not to cut the cords. Other cutting tools may be used, including heated knife, water jet, oscillating blade, needle, laser, and the like.

The cords of the ply material may be at an angle (i.e., not parallel to the drum axis). For example, as shown in the aforementioned U.S. Pat. No. 4,504,337, a measuring drum is provided with "a diagonal line 20 along which a cutter [knife 49] may be traversed to sever a length of ply material."

The False Drum is typically an assembly of different components. The cutting slot (204) is typically contained in a component of the False Drum which is referred to herein as a "cutting segment". To be able to accommodate a range of cord angles (hence knife blade angles), without having to replace a drum segment with slots for each and every cord angle, the slot needs to be wide enough to cover at least a range of angles. For a large range of angles, a wide slot is needed. (Slot width is measured in the circumferential direction of the drum.) However, having a wide slot causes a problem in that, after the ply material (or any material) is cut, the cut end of the ply material overhanging (overlying) the slot is not supported by the outer surface of the False Drum during the transfer of the ply material to the tire building drum. Apart from making the transfer unreliable, an air channel may be created at this location in the tire, resulting ultimately in a tire defect.

It should be understood that the general purpose of the slot is essentially contrary to that of an anvil. An anvil is like a cutting board. When you are cutting a loaf of bread, you put the bread on the cutting board, and slice it with a knife, and the cutting board (resting on a counter top) provides a resistive force against the force exerted by the knife. In the case of a slot, and the cutting tools used for cutting the described tire materials, it is desired that the end (or tip) of the cutting tool be received, without resistance, in the slot. Generally, if there were no need for a slot, there would be no need for a door panel which can selectively be opened and closed to reveal and conceal the slot, as described hereinafter.

FIG. 6A (compare FIG. 4) illustrates a False Drum 220. The drum 220 is cylindrical, and has an axis 222. The drum 220 has perforations 228 in its outer surface for holding ply material (not shown) thereon, for cutting to a desired length. A "butterfly" shaped slot 224 is shown extending generally axially across the drum 220. The slot 224 is circumferentially narrowest at the middle (axially) of the drum 220, and becomes circumferentially wider towards the opposite ends of the drum 220. The slot 224 is basically defined by two lines intersecting one another at the middle of the drum, one line being inclined at a positive small angle (e.g., up to 10-degrees) with respect to the axis 222, the other line being inclined at a negative corresponding small angle (e.g., up to 10-degrees) with respect to the axis 222. The fact that the slot 224 is circumferentially narrower near the middle of the drum is also evident from the cross-sectional view of FIG. 6B, and that it is circumferentially wider away from the middle of the drum is evident from the cross-sectional view of FIG. 6C. The slot 224 is disposed at what is referred to as a "cut position" on the drum.

A problem addressed by the present invention can therefore be summarized as having a discontinuity, in the form of a radially inwardly-extending slot, in the outer surface of the False Drum. Although a single circumferentially very narrow slot may be acceptable, a circumferentially wider slot for accommodating a range of cord angles (including the butterfly-shaped slot 224) is generally not acceptable, because of the resulting lack of support for the end of the cut ply material overlying the slot. It is therefore an object of the present invention is to eliminate the problem of having unsupported ply material in the cutting slot area of a False Drum.

The invention solves the problem of unsupported material ends by introducing a mechanism which opens (exposes, reveals) the slot when cutting the component, but which otherwise keeps the slot closed (hidden, concealed), as described in greater detail hereinbelow.

FIG. 7A (compare FIG. 6A) illustrates a False Drum 300. The drum 300 is cylindrical, and has an axis 302. The drum 300 is shown without perforations (e.g., 128), for illustrative clarity. The drum 300 is shown with a door panel removed—the door panel being illustrated and described in greater detail with respect to FIGS. 7B and 7C. FIGS. 7B and 7C are cross-sectional views illustrating the drum 300 in two different conditions—in FIG. 7B with the door panel open, exposing the slot for cutting, and in FIG. 7C with the door panel closed (slot concealed) for applying material to the False Drum or for transferring cut material from the False Drum to a tire building drum (not shown). In this example, the drum 300 is shown as having its outer surface 304 covered with a porous material 306, such as felt (or similar material) for thin gauge tire components, or with foam rubber (e.g., neoprene, silicone rubber, polyurethane foam) for thicker gauge tire components.

The invention generally comprises a False Drum (drum) having a slot 330, and a panel (door panel) 322 selectively closing (covering) the slot so that the outer cylindrical surface of the drum is not interrupted by the discontinuity of a slot, for the reasons described hereinabove. The invention is applicable to essentially any size and/or shape slot, at any angle, such as a circumferentially-wide generally rectangular slot, or a "butterfly" shaped slot such as described hereinabove. The door panel which covers (conceals) the slot has substantially the same size and shape as the slot, just like a door in a house has substantially the same (typically rectangular) size and shape as the doorway (door frame).

As best viewed in FIGS. 7B and 7C, a mechanism 320 for selectively opening and closing a slot of a False Drum (300) comprises:

an elongate lever 324, and the door panel 322 is supported at one end of the lever;

the other end of the lever 324 is pivotally attached to a suitable stationary portion (point) of the drum;

a spring 326 extending between an inner surface of the door panel 322 and another stationary portion (point) of the drum; and a pneumatic tube 328 disposed between the lever 324 and another stationary portion (point) of the drum.

In this embodiment, with the arrangement of elements 324, 326, 328 recited immediately above, the spring 326 biases the panel 322 to an open position, as shown in FIG. 7B. The door panel 322 is "normally open". The slot 330 is normally revealed (exposed). In the absence of any other forces (including centrifugal force, which is not normally a consideration in False Drums), the door panel 322 remains open, revealing a slot 330 (compare 204) in the surface of the drum. The slot 330, as described hereinabove with respect to FIG. 6, is for allowing a cutting instrument (e.g., 208) to pass through material (e.g., 206) placed on the surface of the drum. With the door panel 322 open, material disposed on the surface of the drum may be cut. In this case, the "slot" is essentially a pocket for containing the mechanism 320.

After material disposed on the surface of the drum is cut, excess material (selvage) may be removed (and discarded, or recycled), and the cut end (edge) of the material overlying the slot 330 will not be supported. It can droop into the slot, and cause problems. Therefore, the door panel 322 is caused to be moved to its closed position, as shown in FIG. 7C. In this embodiment, with the arrangement of elements recited immediately above, this is accomplished by inflating the pneumatic tube 328 which, when inflated, increases in diameter and exerts a lifting force on the underside of the lever 324, the free end of which then moves radially (with respect to the drum) outward, thereby moving the door panel 322 into its closed position so that its outer surface is contiguous with the outer surface of the drum. (The tube 328 operates on what is sometimes referred to as the "fire hose" principle. Without fluid pressure therein, the tube is collapsed. With pressure, is becomes expanded, and this can happen rapidly and in a controllable manner.) This has the effect of lifting up an end of material which may be drooping into the slot 330 and, in any case, presents a continuous surface at the exterior of the drum, a surface which (with the door panel closed) does not exhibit the discontinuity of a slot. The outer surface of the door panel 322 may be covered with the same porous material 306 covering the surface of the drum. This provides (when the door panel is closed) a complete surface on the False Drum circumference with uniform properties.

As best viewed in FIG. 7C, the door panel 322 is prevented from overtravel because its side edge (right, as viewed in the figure) is tapered. (Because of its size and shape, relative to the opening, and the manner in which its motion is constrained, by virtue of being mounted to the end of a lever, the door panel simply cannot pivot past the outer surface of the cylinder.) When the door panel is flush with the surface of the drum, it is prevented from further radially outward movement. In any case, the tube 328 is readily dimensioned and located so that when the tube 328 is fully inflated, the door panel is simply in its closed position, no less, no more. It is within the scope of the invention that a more "positive" stop mechanism (analogous to the molding of a door jamb) can be provided to stop the door panel exactly in position flush with the surface of the drum, in which case the mechanism (e.g., tube 328) exerting the closing force on the door panel can be designed to exert excessive force on the door panel to ensure that it aggressively stays shut when it is desired that it be shut.

FIG. 7A illustrates a plurality (e.g., five) mechanisms 320 distributed substantially at evenly-spaced intervals along the length of the slot (width of the material being cut). This is generally to ensure uniform closing forces on the door panel along the (axial) length of the slot, and also allows each mechanism to be designed for only a portion of the overall load, thereby reducing the size constraints upon an individual one of the mechanisms. It is within the scope of the invention that any number of mechanisms 320, or alternative mechanisms (discussed briefly, hereinbelow) for opening and closing the door panel 322, or multiple door panels (discussed briefly, hereinbelow) can be utilized.

It is also within the scope of the invention that multiple door panels can be used to open and close a slot. For example, with regard to a butterfly-shaped slot, which essentially has two apex-to-apex triangular portions, one triangular portion of the slot can be opened and closed by a one door panel, and the other triangular portion of the slot can be opened and closed by another door panel. A separate mechanism can be provided for each of a plurality of door panels, or a single common mechanism can be used for operating the plurality of door panels.

In use, an exemplary sequence of operation:
(a) the door panel(s) may (optionally) initially be closed;
(b) material is laid up on the drum for (measuring and) cutting;
(c) the door panel(s) is/are opened (if not already open) for cutting;
(d) the cutting tool cuts the material;
(e) excess (cut off) material may (optionally) be removed (discarded);
(f) the door panel(s) is/are closed; and
(g) the cut material is transferred in a conventional manner to a tire building drum.

In the embodiment described above, the basic mechanism 320 for opening and closing the door panel 322 comprises a lever 324, a spring 326, and an inflatable tube 328, and the mechanism may be replicated a number of times, as desired, over the extent of a slot. It is within the scope of the invention that other types of mechanism can be used, such as air cylinders, electrical motors, mechanical cams, etc.

Regardless of the mechanism selected, the invention eliminates the need for using different False Drum cutting segments for different cord angles for different tire constructions. Furthermore, by closing the slot prior to the application of the component to the tire building drum, a source of tire defects is eliminated. Higher reliability of the transfer of components will inevitably be achieved.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of supporting material overlying a cutting slot of a False Drum, characterized by:
   providing a cylindrical drum having a perforated cylindrical outer surface upon which the material is laid and cut to a required length, the cutting slot being a radially inwardly-extending discontinuity in the outer surface of the drum extending generally axially from end-to-end of the cylindrical outer surface, the slot extending through the cylindrical outer surface and being sized and shaped to permit a cutting tool to pass through a portion of the material overlying the slot, the slot being circumferentially narrowest at a middle of the cylindrical drum, and is circumferentially wider towards opposite ends of the drum;
   providing a door panel having substantially the same size and shape as the slot;
   opening the slot when cutting the material; and closing the slot when not cutting the material so that an outer surface of the door panel is contiguous with the outer surface of the drum.

2. Method, according to claim 1, characterized by:
closing the slot after the material is cut.

3. Method of cutting material on a False Drum having a cylindrical outer surface and a slot in the surface for receiving an end of a cutting tool characterized by:
providing the slot as a radially inwardly-extending discontinuity in the outer surface of the drum, the slot extending generally axially from end-to-end of the cylindrical outer surface, the slot extending through the cylindrical outer surface and being sized and shaped to permit the cutting tool to pass through a portion of the material overlying the slot, the slot being circumferentially narrowest at a middle of the cylindrical drum, and is circumferentially wider towards opposite ends of the drum;
providing a door panel having substantially the same size and shape as the slot; and
providing a mechanism for selectively opening and closing the slot with the door panel whereby when the slot is closed, an outer surface of the door panel is contiguous with the outer surface of the drum;
disposing the door panel in the slot;
laying material on the cylindrical surface, and overlying the slot;
opening the door panel to expose the slot; and
with a cutting tool, cutting the material at the slot.

4. Method according to claim 3, characterized by:
after cutting the material, closing the door panel to conceal the slot.

5. Method according to claim 3, characterized by:
before laying the material on the surface, closing the door panel.

6. Method according to claim 3, characterized by:
after cutting the material, removing excess material.

7. Method according to claim 3, characterized by:
after cutting the material, closing the door panel to conceal the slot; and
after closing the door panel, transferring the material to a tire building drum.

* * * * *